Oct. 21, 1958 M. R. SCHROEDER 2,857,465
VOCODER TRANSMISSION SYSTEM
Filed Nov. 21, 1955 4 Sheets-Sheet 1

INVENTOR
M. R. SCHROEDER
BY Harry C. Hart
ATTORNEY

INVENTOR
M. R. SCHROEDER
BY Harry C. Hart
ATTORNEY

INVENTOR
M. R. SCHROEDER
BY Harry C. Hart
ATTORNEY

VOCODER TRANSMISSION SYSTEM

Filed Nov. 21, 1955 4 Sheets-Sheet 4

INVENTOR
M. R. SCHROEDER
BY Harry C. Hart
ATTORNEY 2,857,465

VOCODER TRANSMISSION SYSTEM

Manfred R. Schroeder, Summit, N. J., assignor to Bell Telephone Laboratories, Incorporated, New York, N. Y., a corporation of New York Application November 21, 1955, Serial No. 548,078

19 Claims. (Cl. 179—15.55)

This invention relates to economy in the transmission of information, and particularly to the narrow-band transmission, from one locality to another, of the significant information-bearing characteristics of a speech wave or telephone signal.

Of the many systems which have been proposed for effecting a reduction in the width of the frequency band required for the transmission of telephone signals, the one over which the present invention offers improvements is the so-called "Resonance Vocoder." In presently known systems of this sort the entire frequency band of the voice signal is broken down into a small number, e. g., three, of comparatively broad contiguous subbands through the agency of filters, and two control signals are derived at the transmitter station for each of these subbands, of which one is supposed to represent the frequency of the principal component of the speech energy passing through the subband filter while the other represents its amplitude. These control currents, which together require much narrower transmission bands than the voice signal from which they are derived, are transmitted to a receiver station where they control the operation of artificial voice-synthesizing apparatus. A "buzz" source, tuned by a supplementary control signal, likewise generated at the transmitter station, or a "hiss" source, as the case may be, in dependence on whether the sound being analyzed is voiced or unvoiced, is applied as a driving signal to a network, which simulates the human vocal tract. The elements of which this network is constructed are altered and varied by the control currents derived as above described in a fashion to simulate the changes of configuration of the vocal tract which take place in the course of the articulation of speech sounds. The output currents of these several networks are then combined electrically, and, finally, the resulting composite signal is converted into audible sound by a reproducer. A prototype resonance vocoder is described in H. W. Dudley Patent 2,243,527, May 27, 1941, and various modifications and improvements thereover are described in J. C. Steinberg Patent 2,635,146, April 14, 1953, in R. C. Mathes Patent 2,672,512, March 16, 1954, and in an application of E. S. Weibel Serial No. 428,167, filed May 7, 1954, now matured into Patent 2,817,707, granted December 24, 1957.

As distinguished from the "filter bank" vocoder of H. W. Dudley Patent 2,151,091, March 21, 1939, which treats voice wave components of all frequencies alike, the resonance vocoder is based on the recognition that the envelope of the spectrum of a voice wave results from resonances in the vocal tract—throat, mouth, nasal cavities, and so forth—and not from the vibration of the vocal cords, wherefore this envelope is independent of the pitch of the voice. The characteristic voice spectrum envelope contains three peaks or "formants" which, for a male voice pronouncing the vowel "ah—" are located on the frequency scale at approximately 750, 1,500, and 2,500 cycles per second, respectively. Hence the common practice is to proportion the subband filters to pass the ranges 300–800, 800–2,300 and above 2,300 cycles per second, respectively.

The frequency subband control signals which such a system requires are commonly derived by some kind of "frequency meter;" i. e., a discriminator, an axis crossing counter, or the like, whose function it is to determine the "frequency" of that particular harmonic component of the voice signal lying within a particular subband which is of greatest amplitude or carries the greatest amount of energy; i. e., the frequency of a particular formant.

In order that this approach shall succeed, it is necessary that each subband shall contain one and only one such formant, and the filter pass bands are normally chosen with this in mind. But it is an inescapable empirical fact that the range through which the frequency of the first formant may vary overlaps that of the second formant and the range of the second overlaps that of the third. Hence, whatever fixed contiguous subbands may be selected, it is inevitable either that the formant which it is intended to embrace shall escape from it to appear in the neighboring subband, or that two formants shall occasionally appear within a single subband. In such a case the control signals which are intended to control the modulation of the network which reconstructs one formant actually modulate, instead, a network which reconstructs a different formant. Hence, when either of these conditions occurs, the reconstructed voice sounds unnatural.

With present known frequency-measuring devices it is obviously out of the question to proportion the analyzing filters to have overlapping pass bands, for the reason that, should two formants simultaneously appear in one of them, the frequency to be measured would be completely indefinite.

Suggestions have been put forward that this difficulty might be overcome by resort to variable band filters each of which, by appropriate control circuits, could be made to follow or "track" a preassigned harmonic. Such a system is complex, cumbersome, and so slow of response as to render its practical value doubtful.

The present invention approaches the problems of identifying the individual speech formants and generating a reliable pair (frequency and amplitude) of control currents for each of them from a completely different standpoint. The tempting, though illusory, concept of a unique "frequency," namely that of the formant peak, is abandoned. Instead, the invention treats the spectrum envelope as a statistical distribution of frequencies whose number may be very large; indeed it may be infinite. It then seeks out a particular function, known in statistical analysis as a "Moment" of this distribution, and advantageously its First Moment. It turns out that this quantity, while not equal to the formant peak frequency, is closely related to it: The more definite the formant peak, the more nearly the Moment is equal to its frequency. Control currents proportional to these Moments are derived and they are found to serve excellently, at the receiver station, in controlling the modulations of the artificial voice reconstruction apparatus. By virtue of the Moment approach it becomes possible to identify one specified formant in the presence of another. Hence the need, at the analyzer station, for contiguity between adjacent filter pass bands disappears. To the contrary, each filter may be so proportioned that its pass band overlaps those of its neighbors by a substantial margin, such as fifty percent of its bandwidth. Consequently the formant for which it is primarily designed always falls within it. When it is the only one which does so, the Moment of the spectral distribution of energy within that pass band is closely equal to the formant peak frequency. When, to the contrary, two formants lie within a single pass band the Moment of the resulting double-peaked distribution, while it is clearly indicative of the desired formant, is nevertheless influenced by the presence of the other, undesired, formant. Under this condition, the frequency control current is slightly in error. Such an error is of far less significance than the kind of error which bedevils prior art apparatus, namely one in which a pair of control currents temporarily indicate the frequency and amplitude of the wrong formant.

It is an important feature of the invention that the Moments, while they are of course functions of frequency, are nevertheless determined by operations in the time domain. To do so makes for great economies of apparatus. The analytical justification for so doing will be given in detail below. It is ultimately based on the Fourier Theorem which establishes equality between a time function or wave and its spectrum.

The invention will be fully apprehended from the following descriptions of illustrative embodiments thereof, taken in conjunction with the appended drawings, in which.

Figure 1:
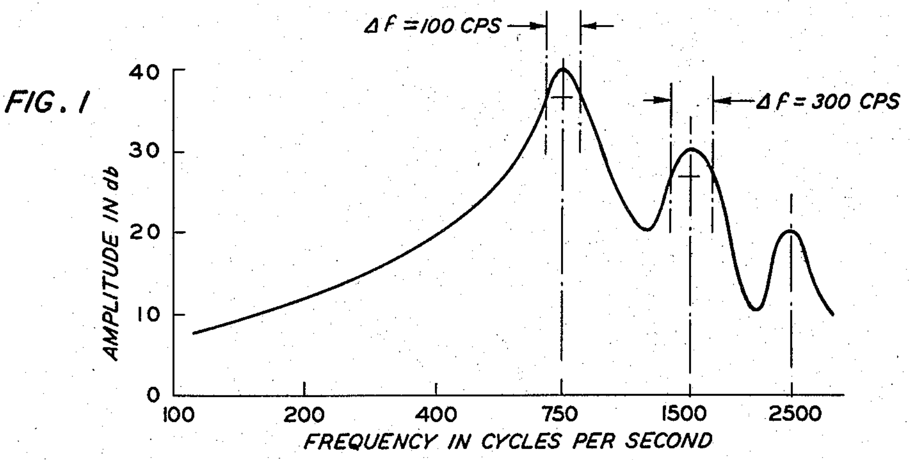
Fig. 1 is a diagram showing the power spectrum of a typical speech sound.

Before entering upon a detailed description of the apparatus of the invention and of the fashion in which it operates, it will be of advantage to establish a solid analytical foundation for the principles which it embodies.

*Analytical foundations*

For every physically realizable, nonvanishing function F, of any real variable, $x$, defined between limits $a$ and $b$, there exists an average value $\bar{x}$ of the variable. Its magnitude is given by $$\bar{x}=\frac{\int_a^b xF(x)dx}{\int_a^b F(x)dx} \qquad (1)$$

and it is known as the First Moment, $M_1$ of the function $F(x)$. Hence $$\bar{x}=M_1$$

Similarly, the Second Moment $M_2$ is defined as $$M_2=\overline{x^2}=\frac{\int_a^b x^2F(x)dx}{\int_a^b F(x)dx} \qquad (2)$$

If the limits $a$, $b$, between which the function F is defined happen to be minus and plus infinity, these formulae become $$M_1=x=\frac{\int_{-\infty}^{\infty} xF(x)dx}{\int_{-\infty}^{\infty} F(x)dx} \qquad (3)$$

$$M_2=\overline{x^2}=\frac{\int_{-\infty}^{\infty} x^2F(x)dx}{\int_{-\infty}^{\infty} F(x)dx} \qquad (4)$$

Now if the independent variable of interest happen to be radian frequency, $\omega$ (hereinafter termed, for short, "frequency"), then $F(x)$ becomes $F(\omega)$ and if, furthermore, the function of interest be the power spectrum $S(\omega)$ of this frequency then (3) and (4) become $$M_1=\bar{\omega}=\frac{\int_{-\infty}^{\infty} \omega S(\omega)d\omega}{\int_{-\infty}^{\infty} S(\omega)d\omega} \qquad (5)$$

and $$M_2=\overline{\omega^2}=\frac{\int_{-\infty}^{\infty} \omega^2 S(\omega)d\omega}{\int_{-\infty}^{\infty} S(\omega)d\omega} \qquad (6)$$

For reasons which will appear below, interest is restricted to integrals of which the lower limit is 0 as distinguished from $-\infty$. But, in the case of functions $S(\omega)$ of practical interest it turns out that it is impossible mathematically to transform equation 5 as required below in the lower limits of the integrals are 0.

The case is otherwise, however, with Equation 6. Because the function $S(\omega)$ is a symmetrical one and because the factor $\omega^2$ in the numerator does not alter this symmetry, each of the integrals, in numerator and denominator, is exactly twice as great as is the integral of the same integrand between the limits 0 and $\infty$. Hence Equation 6 may be written $$M_2=\overline{\omega^2}=\frac{\int_0^{\infty} \omega^2 S(\omega)d\omega}{\int_0^{\infty} S(\omega)d\omega} \qquad (7)$$

From the Fourier Theorem it is known that the mean square of a time function $g(t)$ is equal to the definite integral of its power spectrum $S(\omega)$; Thus $$\overline{g^2(t)}=\int_0^{\infty} S(\omega)d\omega \qquad (8)$$

Similarly, the mean square of the first derivative $g'(t)$ is given by $$\overline{(g'(t))^2}=\int_0^{\infty} \omega^2 S(\omega)d\omega \qquad (9)$$

Now the ratio of (9) to (8) is evidently equal to (7). Hence the Second Moment, $\overline{\omega^2}$ of the power spectrum $S(\omega)$ of a time function $g(t)$ is given by this ratio; i. e., $$\frac{\overline{(g'(t))^2}}{\overline{(g(t))^2}}=\overline{\omega^2}=M_2 \qquad (10)$$

While it might be possible to develop the control signals required for the vocoder from the Second Moments, and, in principle, to construct a system accordingly, the instrumentation of such a system would evidently require a number of square-root-taking devices. These are not reliable except within restricted ranges of operation. Hence it is preferred to develop vocoder control currents from First Moments, as distinguished from Second Moments. Because of the mathematical difficulties referred to, the required First Moments must be derived from the Second Moments developed above. This may be done as follows.

Let it first be recognized that, for a wave, such as a speech wave, having no steady component, the principal effect of squaring each of its amplitudes is to replace each negative value by a positive value. Now this is precisely the effect of full wave rectification, or "taking absolute values." Hence, the mean rectified wave is closely equal to the root mean square of the original wave; Thus $$\overline{|g(t)|}=k\sqrt{\overline{(g(t))^2}} \qquad (11)$$

and similarly, $$\overline{|g'(t)|}=k'\sqrt{\overline{(g'(t))^2}} \qquad (12)$$

where $k$ and $k'$ are constants of the order of unity. Furthermore, in waves having the characteristics of speech waves, differentiation does not substantially affect the amplitude distribution, in any event within a subband which usually includes only a single formant.

Hence $$k'\doteq k$$

Dividing (12) by (11) and substituting (10) gives $$\frac{\overline{|g'(t)|}}{\overline{|g(t)|}}\doteq\sqrt{\frac{\overline{(g'(t))^2}}{\overline{(g(t))^2}}}=\sqrt{\overline{\omega^2}}=\sqrt{M_2} \qquad (13)$$

For a power spectrum $S(\omega)$ which extends principally over a relatively narrow frequency range, the mean square frequency $$\overline{\omega^2}$$

is equal to the square of the mean frequency $$\bar{\omega}^2$$

plus a correction factor whose magnitude depends on the width of the band of interest. Thus $$\overline{\omega^2}=\bar{\omega}^2+\overline{\Delta\omega^2} \qquad (14)$$

Expanding (13) by the binominal theorem and substituting (14) gives $$\frac{\overline{|g'(t)|}}{\overline{|g(t)|}}=\bar{\omega}\left(1+\frac{1}{2}\frac{\overline{\Delta\omega^2}}{\bar{\omega}^2}++\right) \qquad (15)$$

Thus, aside from the correction factor included in the terms of the parenthesis higher than the first, and with the approximations noted above, none of which involves a serious error $$\frac{\overline{|g'(t)|}}{\overline{|g(t)|}}\doteq\bar{\omega}=M_1 \qquad (16)$$

That is to say, the First Moment $M_1$ or "center of gravity" $\bar{\omega}$ of the spectrum is closely equal to the ratio of the mean absolute value of the differentiated wave to that of the original wave. Another way of putting it is that the relative mean (absolute) slope of the wave is equal to its mean radian frequency.

Thus, to obtain a control signal which is closely proportional to the First Moment $M_1$ of the power spectrum $S(\omega)$ of the voice wave $g(t)$, it is quite unnecessary to resort to frequency analysis. Rather, the required signal can be obtained more simply and directly in the time domain by (*a*) differentiating the signal; (*b*) rectifying (full wave) the signal and its derivative individually; (*c*) averaging these rectified values, and (*d*) taking the ratio of these averages. The invention in one of its aspects provides means for carrying out these operations.

The First Moment $M_1$ which, as above established, is substantially equal to the quantity $\bar{\omega}$, and which is here employed to define the position of a formant, differs somewhat from the frequency of the formant resonance peak frequency. While a close relation holds between these two quantities in the case of a symmetrically shaped formant, this is not always true for the rather oddly shaped spectra of speech waves. In these cases, however, the mean frequency $\bar{\omega}$ appears to be a more significant quantity, and a more useful one, than the more accidental location of the peak.

This concept is even more important in the case of the broad spectral bands of fricatives, where various moments of the spectral power distribution provide the most natural concepts for the description of a given spectrum with a few parameters.

*Other moments*

From the foregoing it will readily be appreciated that the power spectrum of the integrated wave, $g^-(t)$, is given by $$\overline{(g^-(t))^2}=\int_0^\infty\frac{1}{\omega^2}S(\omega)d(\omega) \qquad (17)$$

leading to $$\frac{\overline{(g(t))^2}}{\overline{(g^-(t))^2}}=\frac{1}{\overline{\frac{1}{\omega^2}}}=\overline{\omega^2}\ \text{(integrated)} \qquad (18)$$

which may be approximated by $$\frac{\overline{|g(t)|}}{\overline{|g^-(t)|}}\doteq\bar{\omega}\left(1-\frac{3}{2}\frac{\overline{\Delta\omega^2}}{\bar{\omega}^2}+\ \ldots\right) \qquad (19)$$

Similarly the power spectrum of the differentiated wave, $g'(t)$ and of the twice-differentiated wave, $g''(t)$ are given by $$\overline{(g'(t))^2}=\int_0^\infty\omega^2S(\omega)d\omega \qquad (20a)$$

and $$\overline{(g''(t))^2}=\int_0^\infty\omega^4S(\omega)d\omega \qquad (20b)$$

leading to $$\frac{\overline{(g''(t))^2}}{\overline{(g'(t))^2}}\doteq\frac{\overline{\omega^4}}{\overline{\omega^2}}\doteq\overline{\omega^2}\ \text{(differentiated)} \qquad (21)$$

which may be approximated by $$\frac{\overline{|g''(t)|}}{\overline{|g'(t)|}}\doteq\bar{\omega}\left(1+\frac{5}{2}\frac{\overline{\Delta\omega^2}}{\bar{\omega}^2}+\ \ldots\right) \qquad (22)$$

and similarly for other Moments.

Apart from the fact that Equations 10 and 16 give the Moments of the spectrum, the measuring method itself, as implied in these equations, is superior to presently known methods of formant position measurement. This is so because the processes appearing on the left sides of Equations 10 and 16 make use of the whole waveform rather than only part of it. Consequently, the measurements are least affected by all kinds of random disturbances.

*Formant separation*

As indicated above, an important feature of the Moment approach is that it enables a desired formant to be identified in the presence of an undesired one. While the presence of a second formant within a subband which normally contains only a first formant influences the determination somewhat, it does not vitiate it. The explanation of this phenomenon is as follows.

Fig. 1 illustrates the amplitude spectrum of an average male voice pronouncing the vowel a as in "had." Consider, for example, the problem of separating the first formant from the second when they both lie within a pass band which excludes the third formant.

To investigate, mathematically, the degree to which the determination of each formant may be influenced by the presence of another formant, the details of the shapes of the formants in question may be disregarded and simpler shapes, representing the same energies and the same frequencies, may be substituted. Thus, in Fig. 1 the first formant resonance peak lies at 750 cycles per second and its width, defined as the separation on the frequency scale between two points which are 3 decibels down from the peak, is 100 cycles per second. In the case of the second formant resonance, its peak frequency is 1,500 cycles per second, its width, similiarly defined, is 300 cycles per second, and its peak lies 10 decibels down from the peak of the first formant. From these data the frequencies and energies of the first and second formants of Fig. 1 may be replotted as the rectangles of Fig. 2, wherein the central frequencies, the heights of the resonance peaks, and their widths are all preserved. From Fig. 2 it is immediately seen not only that the frequency $\omega_2$ of the second formant is twice the frequency $\omega_1$ of the first formant, but also that the energy $a_2^2$ of the second formant is one-third the energy $a_1^2$ of the first formant. For this distribution of energy and frequency, the following relations evidently hold:

$$\int S(\omega)d\omega = a_1^2 + a_1^2 \qquad (23a)$$

$$\int \omega^2 S(\omega)d\omega = a_1^2.\omega_1^2 + a_2^2.\omega_2^2 \qquad (23b)$$

$$\int \omega^4 S(\omega)d\omega = a_1^2.\omega_1^4 + a_2^2.\omega_2^4 \qquad (23c)$$

$$\int \frac{1}{\omega^2} S(\omega)d\omega = \frac{a_1^2}{\omega_1^2} + \frac{a_2^2}{\omega_2^2} \qquad (23d)$$

Substituting (23*a*) and (23*d*) in (18) gives, taking account of (8) and (17), $$\overline{\omega^2}\ (\text{integrated}) = \frac{a_1^2 + a_2^2}{\frac{a_1^2}{\omega_1^2} + \frac{a_2^2}{\omega_2^2}} \qquad (24a)$$

$$= \omega_1^2 \frac{1 + \left(\frac{a_2}{a_1}\right)^2}{1 + \left(\frac{a_2}{a_2}\right)^2 \frac{(\omega_1)^2}{\omega_2}} \qquad (24b)$$

$$= C_1^2 \omega_1^2 \qquad (24c)$$

Substituting (23*b*) and (23*c*) in (21) gives, $$\overline{\omega^2}(\text{differentiated}) = \frac{a_1^2\omega_1^4 + a_2^2\omega_2^4}{a_1^2\omega_1^2 + a_2^2\omega_2^2} \qquad (25a)$$

$$= \omega_2^2 \frac{1 + \left(\frac{a_1}{a_2}\right)^2 \frac{(\omega^1)^4}{\omega_2}}{1 + \left(\frac{a_1}{a_2}\right)^2 \left(\frac{\omega_1}{\omega_2}\right)^2} \qquad (25b)$$

$$= C_2^2 \omega_2^2 \qquad (25c)$$

Continuing to disregard the effect of the width, $\Delta\omega$, of the formant peaks, and referring to Equation 14, $$\sqrt{\overline{\omega^2}\ (\text{int})} = \overline{\omega}\ (\text{int}) = C_1\omega_1 \qquad (26)$$

and $$\sqrt{\overline{\omega^2}\ (\text{diff})} = \overline{\omega}\ (\text{diff}) = C_2\omega_2 \qquad (27)$$

Figure 2:
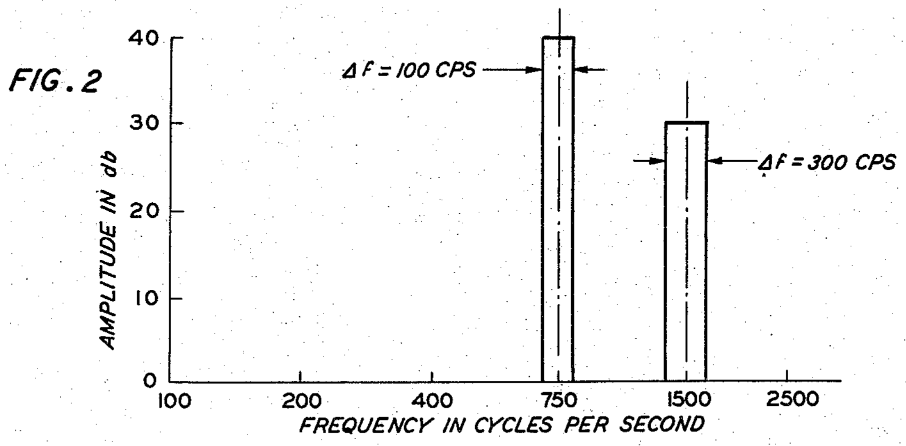
Fig. 2 is a diagram of assistance in explaining certain features of the invention.

Substitution of values for $\omega_1$, $\omega_2$, $a_1$, and $a_2$ in the typical case illustrated in Fig. 2 gives $$C_1 \sim 1.10$$

$$C_2 \sim 0.82$$

Thus the Moment approach typically singles out a desired formant in the presence of an undesired one with an error, due to the influence of the undesired formant, of only about 15 percent. An occasional error of this magnitude is not serious. If desired, these errors may be still further reduced by resort to correction circuits.

*Vocoder apparatus*

Figure 3:
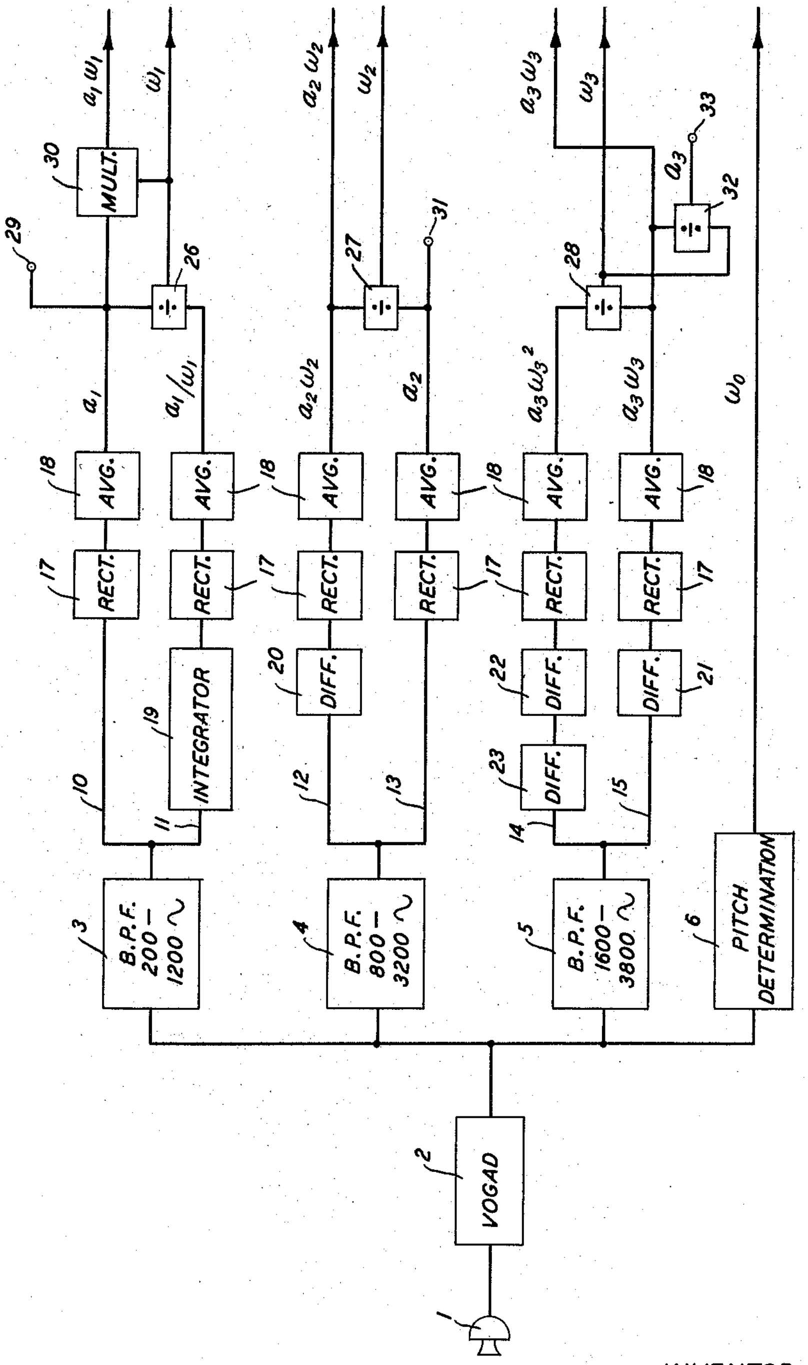
Fig. 3 is a block schematic diagram showing analyzer apparatus in accordance with the invention.

Referring now to the apparatus which turns these considerations to account, Fig. 3 shows transmitter station apparatus in accordance with the invention. Speech waves originating, for example, at a microphone 1 are increased or reduced in volume, as required to maintain the speech signals to be analyzed at a substantially constant energy level, as by a vogad 2 which may be of the type described in Mitchell et al. Patent 2,019,577, November 5, 1935. The output of this device is delivered in parallel to three band-pass filters 3, 4, 5 and to a pitch determining circuit 6. The latter, which may be of the type described in Riesz Patent 2,522,539, September 19, 1950, or otherwise as desired, acts to deliver an outgoing signal which is proportional to the fundamental frequency or pitch of the speech signal.

In accordance with the invention each of the several band-pass filters 3, 4, 5 is constructed to pass a band of frequencies which overlaps the neighboring band or bands. Thus the overlap between the band of the first filter 3 and the band of the second filter 4 extends from 800 cycles per second to 1,200 cycles per second while the overlap between the band of the second filter 4 and that of the third filter 5 extends from 1,600 cycles per second to 3,200 cycles per second. The band of the first filter 3 thus embraces all frequencies at which the first formant of any natural human voice, pronouncing any sound of speech, may appear. This range on the frequency scale includes frequencies at which the second formant sometimes appears, but it is the function of the apparatus to be described to distinguish between two formants which are simultaneously present in a single pass band. Similarly, the bands of the second and third filters embrace all frequencies at which the second and third formants may appear.

The output terminal of each of these band-pass filters is connected to two parallel subpaths in which various operations are carried out. Each of these six subpaths 10–15 contains a full wave rectifier 17 followed by an averaging device 18. These elements may be of well-known construction and the time constant of each of the averaging devices 18 should be adjusted to a frequency lying above syllabic frequencies and below fundamental voice frequencies; i. e., to a frequency of the order of 20–50 cycles per second.

The upper subpath 10 connected to the first filter 3 contains no additional element while the lower one 11 contains, in addition to the rectifier 17 and the averager 18, an integrating device 19 interposed in tandem ahead of them. Of the subpaths 12, 13 connected to the second filter 4 the lower one contains no additional elements, while the upper one contains a differentiator 20 interposed in tandem ahead of the rectifier 17. In the case of the third band-pass filter 5 a single differentiator 21 is interposed in the lower subpath 15 and two differentiators 22, 23 are interposed in the upper one 14.

In the case of each of these pairs of paths the outputs of the averaging devices 18 are connected to the input terminals of a divider 26, 27, 28 in a fashion such that the divider forms the quotient of the signal in the upper subpath divided by the signal in the lower subpath.

In the foregoing analytical development much attention was given to the ratio of two signals, the quotient signal being independent of the amplitudes of divisor and dividend. A moment's thought, however, shows that the integral of any power spectrum $S(\omega)$ is proportional to the area lying under the curve which represents this power spectrum, e. g., the area under the curve of Fig. 1. Hence the output of the uppermost averaging device 26, which is proportional to the integral of the power spectrum, is indicated on the drawing as carrying an energy signal $a_1$. In the lower path 11 the effect of the integrator 19 is, as indicated in Equation 18, to introduce inverse proportionality to frequency. Hence the signal in the lower path 11 is indicated as $$\frac{a_1}{\omega_1}$$

The divider 26 forms the ratio of these two quantities to deliver at its output terminal a signal which is independent of the energy factor $a_1$ and is proportional to the first moment of the spectrum falling within the pass band of the first filter 3. As explained above, this First Moment signal serves as a frequency control signal for artificial voice synthesizing apparatus.

The output of the upper path 10, proportional to energy may, if desired, be transmitted without alteration. An output terminal 29 is shown on the drawing for this purpose. It is preferred, however, to transmit to a receiver station a signal which is proportional to the product of the First Moment of the spectrum by its energy factor: to the product $a_1\omega_1$. To this end, the output of the divider 26 may be combined with the output of the upper path 10 in a multiplier 30 of any desired variety to provide the preferred signal which, along with the frequency control current, may be transmitted to a synthesizer station.

From the foregoing considerations, taken together with the analytical development which precedes the description of the apparatus, it will readily be appreciated that the signal applied to the lower input point of the second divider 27 is proportional to the amplitude of that portion of the spectrum which lies within the pass band of the second filter 4, while, due to the presence of the differentiator 20 the signal applied to the upper input point of the divider 27 is proportional to the product of this amplitude by the First Moment of this portion of the spectrum; i. e., to $a_2\omega_2$. The divider 27 acts to derive from these two a First Moment control signal, $\omega_2$, for the second band. This may be transmitted, along with the output $a_2\omega_2$ of the upper subpath, to the receiver station.

Similarly, in the case of the third subband, two successive differentiations 22, 23, result in the output of the upper averaging device 18 being proportional to $a_3\omega_3^2$, while the output of the lower one is $a_3\omega_3$. The third divider 28 operates to form the ratio of these quantities and deliver a signal proportional to the First Moment $\omega_3$ of that portion of the spectrum lying within the band of the third filter 5. This may be transmitted, along with the product control signal $a_3\omega_3$ derived in the lower subpath, to a receiver station.

If preferred, energy signals $a_2$ and $a_3$ may be transmitted instead of the product signals $a_2\omega_2$ and $a_3\omega_3$. The first is directly available at a terminal 31. The second is readily obtained, with an auxiliary divider 32 connected as shown, from the product signal $a_3\omega_3$ and the Moment signal $\omega_3$. It is available at the output terminal 33 of the auxiliary divider.

Figure 4:
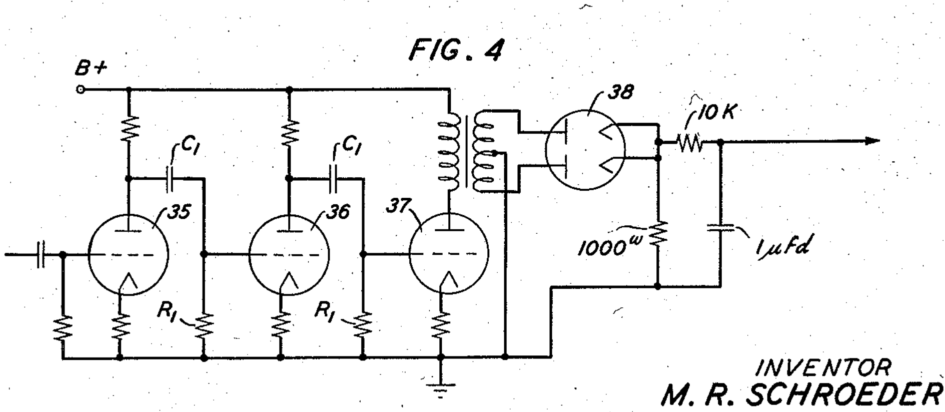
Figs. 4 and 5 are schematic circuit diagrams showing details of circuits which may be employed in the combination of Fig. 3.

Fig. 4 shows circuit details of the tandem combination of a first differentiator, a second differentiator, a rectifier and an averager; i. e., the combination of elements shown in block form in the upper subpath 14 connected to the third band-pass filter of Fig. 3. The subband of frequency components which pass through the band-pass filter 5 is first applied to a buffer amplifier tube 35 whose output circuit is a conventional differentiator comprising a condenser $C_1$ and a resistor $R_1$ in series, the output for application to the following stage being tapped across the resistor. Values of 400 micromicrofarads and 50,000 ohms for the condenser and resistor, respectively, have been found satisfactory and provide a time constant of the requisite order of magnitude. This differentiated output is applied to a second buffer tube 36 whose load circuit, comprising a condenser $C_1'$ and a resistor $R_1'$, may be identical with the first differentiator. After passing thus far the input signal has been twice differentiated.

The output of the second differentiator is now applied through a third buffer tube 37 to a conventional full wave rectifier 38 whose output in turn is connected to ground through a two-branch circuit of which the first branch contains a 1,000 ohm resistor while the second branch contains a 10,000 ohm resistor in series with a one microfarad condenser. This combination of resistors and condenser carries out the averaging operation over time intervals of the required magnitude.

For the lower subpath 15 connected to the third band-pass filter 5 or the upper subpath 12 connected to the second band-pass filter 4 it is only necessary to omit the first differentiator stage comprising the tube 35, the resistor $R_1$ and the condenser $C_1$. For the lower subpath 13 connected to the second filter 4 or the upper subpath 10 connected to the first filter 3 it is only necessary to omit both of these differentiating stages.

Figure 5:
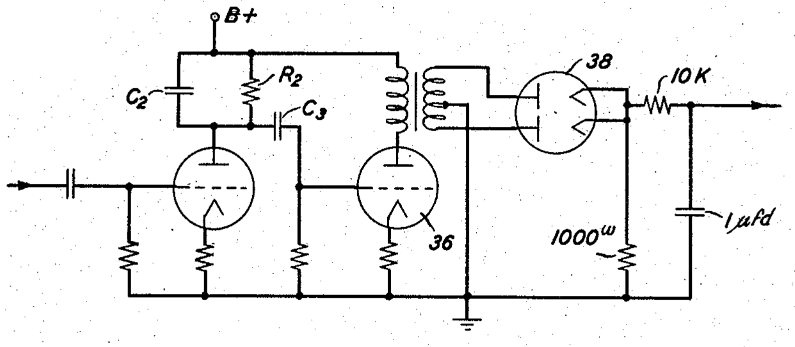

For the lower subpath 11 connected to the first filter 3 an integrating stage is to be substituted for the differentiating stages of Fig. 4. A suitable circuit is shown in Fig. 5. Values of 1 microfarad and 1,000 ohms are suitable for the condenser $C_2$ and the resistor $R_2$, respectively. The condenser $C_3$ is merely a stopping condenser. The rectifier and the averager which follow it are the same as in Fig. 4.

A large number of mechanisms and devices are available for carrying out the operation of multiplying one input signal by another input signal to provide an output signal proportional to their product. Some of these devices are described by S. A. Davis in an article published in Control Engineering for November 1954, volume 1, page 36.

Given an instrumental multiplier, many approaches to the problem of instrumental division are well known. Among these are the following:

(*a*) Provide a high gain amplifier with a tightly coupled negative feedback circuit, and include a multiplier in tandem in the feedback circuit;

(*b*) Provide two amplifiers, one for the divisor quantity and one for the dividend quantity. Apply strong automatic volume control feedback to the dividend amplifier in such a way as to hold its output at constant level. Apply the volume controlling signal of the dividend amplifier also to control the gain of the divisor amplifier. The output of the divisor amplifier is then proportional to the required quotient.

(*c*) Derive a signal proportional to the logarithm of the dividend quantity and another signal proportional to the logarithm of the divisor quantity, employing for this purpose of any of a variety of devices having logarithmic characteristics; then subtract one of the logarithmic signals from the other, and, finally convert the logarithm signal difference into its antilogarithm, employing a device having an exponential characteristic.

Various ways of instrumenting these schemes or alternatives thereof are well known.

Returning to Fig. 3, it has been indicated above that the operation of the elements shown is imperfect. Each of the control signals derived by this apparatus may be more or less in error by 10–20 percent, especially when two formants lie within the pass band of a single one of the band-pass filters. These errors, however, are not serious. It has been found that errors of this order in the magnitude of a frequency control signal or of an energy control signal are scarcely noticeable provided, as in the present case, they rise and fall smoothly. To the contrary, serious degradation in the artificially reconstructed voice results when vocoder control signals of earlier systems, having for a while been comparatively accurate, jump abruptly from a representation of the intended formant to the representation of an unintended one. The present apparatus eliminates the possibility of such a condition. Hence, the signals derived as described above are adequate for vocoder purposes. If desired, further improvement in the precision of these control signals may be secured by resort to error correction techniques.

Figure 6:
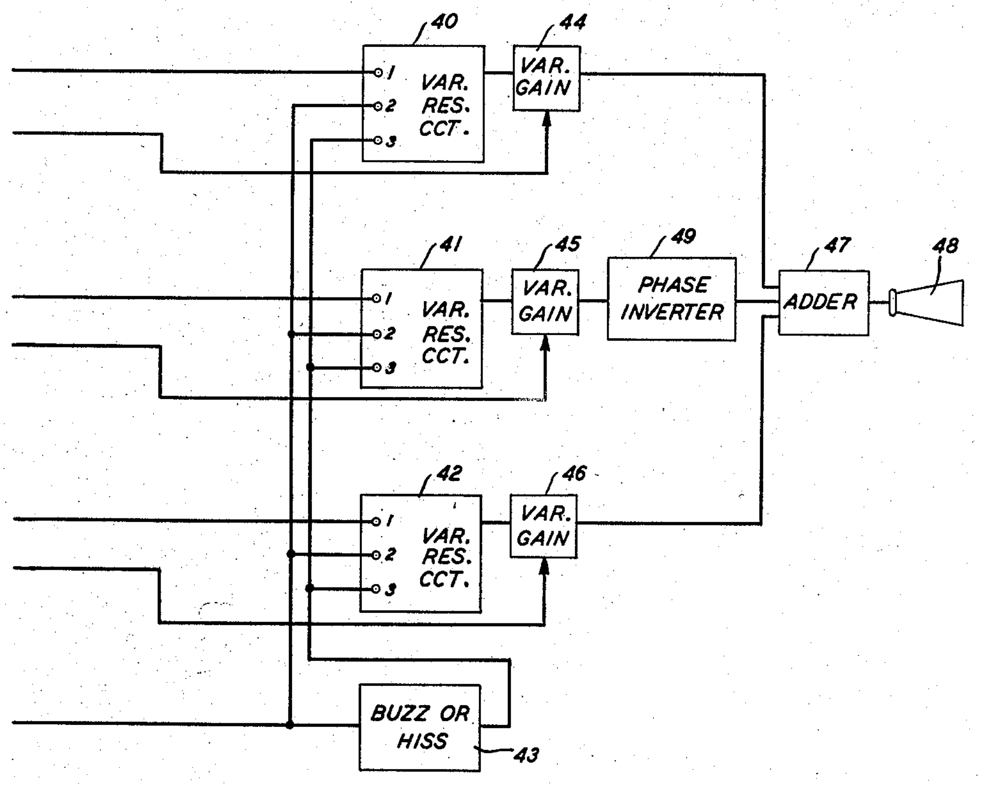
Fig. 6 is a block schematic diagram of artificial voice production apparatus for use in combination with the apparatus of Fig. 3.

The control currents derived in the fashion described above may now be transmitted, along with the pitch control current developed by the element 6, to a receiver station where they may control artificial voice reproduction apparatus. This apparatus, which forms no part of the present invention, may be of the type described in J. C. Steinberg Patent 2,635,146, April 14, 1953 and may in addition include the improvement described in an application of E. S. Weibel, Serial No. 428,167, filed May 7, 1954. It is shown in Fig. 6 for the sake of completeness. It may comprise three variable resonant circuits 40, 41, 42, a "buzz" source of periodic energy and a "hiss" source of aperiodic energy, shown, for simplicity's sake, as a single alternative source 43. The pitch signal operates to select as between buzz energy and hiss energy. In addition the pitch signal controls the frequency of oscillation of the buzz source. The several moment signals, namely, the outputs of the three dividers of Fig. 3, are applied to the No. 1 input terminals of these several variable resonant circuits 40, 41, 42 to adjust their frequencies of resonance, and the pitch control signal is applied in parallel to the No. 2 input terminals of the three variable resonant circuits to control the sharpness of their resonances. As explained in the forementioned application of E. S. Weibel, the resonances of a vocal tract are less sharp in the course of pronunciation of consonants than they are in the course of pronunciation of vowels. Accordingly, the application of the pitch control signal to the No. 2 terminals acts to reduce the circuit damping in the presence of a strong fundamental signal and to increase it when the fundamental pitch signal fails as it does in the case of a consonant or unvoiced sound. The output of the buzz or hiss source 43 is applied in parallel to the No. 3 input terminals of these variable resonant circuits.

The remaining member of each pair of signals derived by the apparatus of Fig. 3 is applied to a variable gain device. Three such devices 44, 45, 46 are interposed in tandem respectively with the output terminals of the three variable resonant circuits 40, 41, 42 and they act to interpose more or less gain or loss as required in these control signals.

The ordinary relaxation oscillator, which may conveniently be employed as a buzz source or, when triggered by a noise source as a hiss source, delivers a train of pulses, periodic or aperiodic, characterized by a succession of spectral components whose amplitudes decrease with their order.

Hence, to maintain outputs of the several variable resonant circuits independent of the particular frequencies to which they are tuned, it is advantageous to compensate for this reduction of component amplitude with frequency by increasing the gain in the output of the variable resonant circuit, not only in proportion to the amplitude control signal, but to the frequency for which this amplitude obtains as well. This is achieved, in accordance with the invention, by application of the product signals, $a_1\omega_1$, $a_2\omega_2$, $a_3\omega_3$, to the control terminals of the variable gain devices 44, 45, 46.

The outputs of the several variable gain devices are additively combined as by application to an adder 47 whose output in turn feeds a sound reproducer 48. As explained in the aforementioned application of E. S. Weibel, improved naturalness of the artificially reproduced voice is secured by the interposition of a phase inverter 49 in tandem with the output point of the second of these three variable gain devices 45.

While each of the circuits of Fig. 3 is capable of selecting and identifying a specified formant, for which it is designed, in the presence of a spurious formant which momentarily lies within the same pass band, difficulties may arise in cases such as that of the second formant path of Fig. 3. If the second band-pass filter 4 have a pass band so wide as to embrace all frequencies at which the second formant may appear, then it may sometimes also embrace either the first formant or the third formant or both together. This condition may introduce errors as great as 50 percent in the second formant moment control current.

Figure 7:
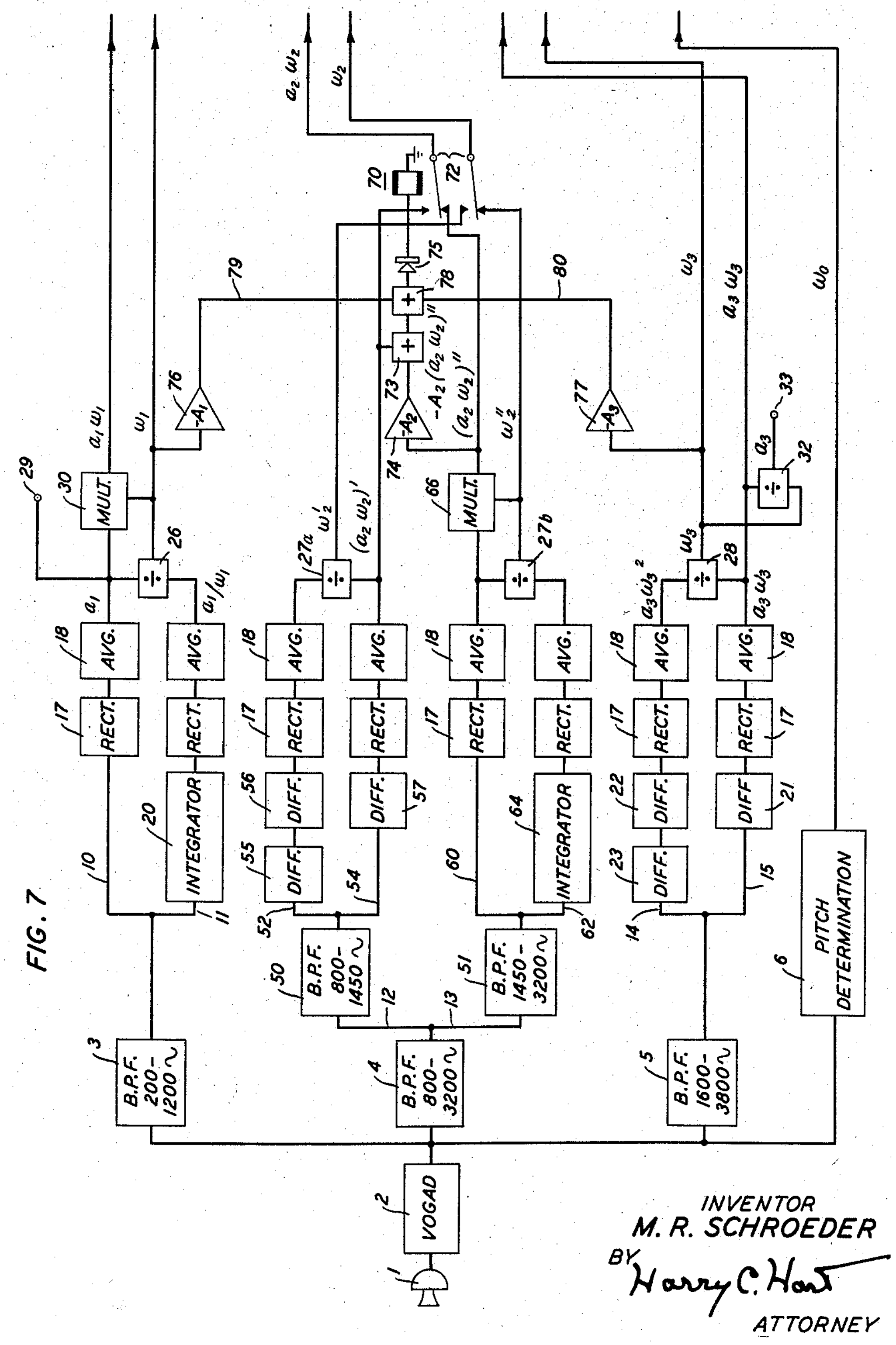
Fig. 7 is a block schematic diagram showing a system embodying the invention and certain refinements over the apparatus of Fig. 3.

Fig. 7 shows a modification of the apparatus of Fig. 3 which is designed to meet this difficulty. The apparatus components connected to the first filter 3 and those connected to the last one 5 may be identical with those of Fig. 3 and may operate, exactly as hereinabove described, to determine a frequency control current and an amplitude-frequency product current for the first formant and for the third. Likewise the pitch-determining apparatus 6 may be as described in connection with Fig. 3. In the case, however, of the second formant band-pass filter 4, two auxiliary band-pass filters 50, 51 are connected in parallel to its output terminal, one of which, 50 passes components in the lower part of the second formant frequency range, while the other, 51, passes components in the upper part of the second formant frequency range. The pass bands of these filters are substantially contiguous with each other, the lower one 50 however, having a substantial overlap with the first band-pass filter 3 and the upper one 51 having a substantial overlap with the last band-pass filter 5.

The currents which pass through the lower band-pass filter 50 are supplied to two parallel paths 52, 54 of which the upper path 52 contains two differentiators 55, 56 while the lower path contains one differentiator 57. The currents passing through the upper band-pass filter 51 are similarly supplied to two parallel paths 60, 62 of which the lower one 60 contains an integrator 64 while the upper one contains neither an integrator nor a differentiator. As with all paths of Fig. 3 and with the first formant paths 10, 11 and the third formant paths 14, 15 of Fig. 7, each of these subpaths 52, 54, 60, 62 contains a rectifier 17 and an averaging device 18.

A divider 27*a* forms the quotient of the outputs of the two averaging devices in the lower half of the second formant frequency range to provide a Moment control signal, while the product control signal is derived directly from the output of the averaging device 18, exactly as discussed in connection with the third formant path of Fig. 3. These signals are designated $\omega_2'$ and $(a_2\omega_2)'$, respectively. Similarly, another divider 27*b* forms the quotient of the outputs of the two averaging devices 18 to provide another Moment control signal while a multiplier 66 provides the amplitude-frequency product signal as in the case of the first formant subpath of Fig. 3. These signals are designated $\omega_2''$ and $(a_2\omega_2)''$, respectively.

The Moment currents and the product currents derived in this fashion are applied to the fixed contacts of a relay 70 which is so connected that its moving contacts are urged against its upper fixed contacts when its winding is energized, resting against its back fixed contacts when the winding is unenergized. Thus, when the relay is energized the moving contacts, and consequently the output terminals 72 to which they are connected, receive the Moment control current and the product current from the upper fixed contacts, namely, those derived from the lower half of the second formant band. When the relay is not energized the output terminals 72 receive control currents derived from the upper half of the second formant band.

The winding of the relay 70 is energized by the combination of several signals. The first signals thus combined by an adder 73 are the product signal $(a_2\omega_2)'$ for the lower half band and the product signal $(a_2\omega_2)''$ for the upper half band, the latter being inverted in phase and multiplied by a constant $A_2$ of the order of unity as by a phase inverting amplifier 74. The output of this added 73 is therefore proportional to $$a_2'\omega_2' - A_2(a_2''\omega_2'')$$

Positive values of this quantity pass readily through a rectifier 75, suitably poled, to energize the winding of the relay 70. To the contrary, negative values bias the rectifier 75 reversely, so that it interposes a high impedance. Hence, for negative values of the control signal, the relay 70 remains unenergized.

Without more the apparatus would therefore stress whichever of the two halves of the second formant frequency range contains the greater amount of energy. This stress might, however, arise spuriously owing to the presence, in the lower half band, of the first formant or the presence, in the upper half band, of the third formant. To counteract these effects two additional control signals are derived, one proportional to the Moment of the first formant as determined in the paths 10, 11 and the other proportional to the Moment of the third formant as determined in paths 14, 15. The polarities of these signals are changed by phase inverting amplifiers 76, 77. Each amplifier preferably has an amplification factor of the order of unity, its optimum value being best determined by trial. These two supplementary control signals are combined in a second adder 78 with the output of the first adder 73 to provide the current which operates the relay 70. Thus the influence of the first formant, when it appears in the lower half of the second formant range is compensated by the control signal in the upper conductor 79 and similarly, the influence of the third formant, when it appears in the upper half of the second formant range, is compensated by the control signal appearing on the lower conductor 80. As a result the Moment control current and the amplitude-frequency control current which appear on the output terminals 72 represent highly reliable indications of the frequency of the second formant alone and of its amplitude-frequency product.

These several control currents may be transmitted, along with the fundamental frequency control current $\omega_0$ derived by the pitch determining circuit 6, to a receiver station which may be identical with that shown in Fig. 6 and hereinabove described.

The invention has been described in connection with an illustrative embodiment in which the First Moments of the band limited power spectra of a speech wave are utilized as formant frequency control currents and these Moments are in turn developed by forming the quotient of any term of the series $$\overline{|g^{-}(t)|},\ \overline{|g(t)|},\ \overline{|g'(t)|},\ \overline{|g''(t)|}$$

by the term of next lower order.

These illustrations, however, are not restrictive. Occasions may arise in which it is advantageous to utilize a double integration, thus providing a term of lower order than the first in the above series, or term of triple differentiation, thus providing a term of a higher order than the fourth in the above series, and so on. It will be readily understood from the foregoing explanation that when any one term of such an extended series is divided by the term of next lower order, a First Moment of the spectrum of the denominator term results. Occasions may also arise in which it is advantageous to employ a statistical Second or higher order Moment which may be developed in the time domain by dividing any term of the series by another term which is lower by two or more orders: e. g., $$\frac{\overline{|g(t)|}}{\overline{|g^{--}(t)|}},\ \text{or}\ \frac{\overline{|g'''(t)|}}{\overline{|g'(t)|}},\ \text{or}\ \frac{\overline{|g''(t)|}}{\overline{|g^{-}(t)|}}$$

and so on.

When the order difference between numerator and the denominator is two, the ratio necessarily gives a control signal which is proportional to the square of the frequency as distinguished from its first power, while when the order difference is three, the ratio gives a signal which is proportional to the cube of the frequency, and so on. Means will suggest themselves to those skilled in the art either for reducing such control currents to direct frequency proportionality or for utilizing them without change, as by appropriate modifications of the control circuits and mechanisms at the vocoder synthesizer station.

Under some conditions it may be found advantageous to practice the invention with respect to some one or more speech formants, e. g., the first formant alone, while disregarding the others or determining them through other means. Moreover, while speech analysis furnishes the best presently known example of a situation in which the invention is needed, it is not necessarily the only one. By its nature, the invention applies to the identification and measurement of any concentration of energy-in-frequency of any periodic or quasiperiodic function.

What is claimed is:

1. In a narrow band speech transmission system, a source of speech signals, a band-pass filter having an input terminal connected to said source, said filter being proportioned to pass a subband which embraces the entire frequency range in which a specified speech formant may appear, and which also includes a part of the frequency range in which neighboring formants may appear, and means connected to said filter for generating two distinct, related, auxiliary, time signals and means for forming the ratio of said auxiliary signals to develop a control signal proportional to a moment of the spectrum of the energy passing through said filter, whereby said control signal is representative of the frequency of the principal formant lying within said subband.

2. Apparatus as defined in claim 1 wherein the signal passing through the subband of said filter is designated $g(t)$, its integral $g^{-}(t)$, its first derivative $g'(t)$, and its second derivative $g''(t)$, and wherein said control signal developing means comprises means for generating at least two members of the series $$\overline{|g^{-}(t)|},\ \overline{|g(t)|},\ \overline{|g'(t)|},\ \overline{|g''(t)|}$$

means for dividing a term of said series by a term of lower order to form a quotient signal, and means for utilizing said quotient signal as a formant frequency control signal.

3. Apparatus as defined in claim 2 wherein said control signal developing means comprises means for generating two adjacent terms of said series and wherein said dividing means comprises means for dividing the term of higher order by the term of lower order to develop said quotient signal.

4. In a narrow band speech transmission system, a source of speech signals, a band-pass filter having an input terminal connected to said source, said filter being proportioned to pass a subband which embraces the entire frequency range in which the first speech formant may appear, and which also includes a part of the frequency range in which the second speech formant may appear, and means connected to said one filter for developing a control signal proportional to a moment of the integral of the spectrum of the energy passing through said filter, whereby said control signal is representative of the frequency of said first speech formant.

5. Apparatus as defined in claim 1 wherein the signal passing through the subband of said filter is designated $g(t)$ and its integral $g^{-}(t)$, and wherein said control signal generating means comprises means for individually developing the quantities $$\overline{|g^{-}(t)|}\ \text{and}\ \overline{|g(t)|}$$

means for dividing the second of said quantities by the first of said quantities to form a quotient signal, and means for utilizing said quotient signal as a formant frequency control signal.

6. In a narrow band speech transmission system, a source of speech signals, a plurality of band-pass filters having input terminals connected in parallel to said source, each of said filters being proportioned to pass a subband which embraces the entire frequency range in which a specified speech formant may appear, and which substantially overlaps the subband passed by at least one other of said filters, and means connected to each of said filters for generating two distinct, related, auxiliary, time signals and means for forming the ratio of said auxiliary signals to develop a control signal proportional to a moment of the spectrum of the energy passing through said filter, whereby each of said control signals is representative of the frequency of a single formant of said speech signals.

7. Apparatus as defined in claim 6 wherein the signal passing through the subband of any one of said filters is designated $g(t)$, its integral $g^{-}(t)$, its first derivative $g'(t)$, and its second derivative $g''(t)$, and wherein said control signal developing means comprises means for generating at least two members of the series $$\overline{|g^{-}(t)|},\ \overline{|g(t)|},\ \overline{|g'(t)|},\ \overline{|g''(t)|}$$

means for dividing a term of said series by a term of lower order to form a quotient signal, and means for utilizing said quotient signal as a formant frequency control signal.

8. Apparatus as defined in claim 7 wherein said control signal developing means comprises means for generating two adjacent terms of said series and wherein said dividing means comprises means for dividing the term of higher order by the term of lower order to develop said quotient signal.

9. In a narrow band speech transmission system, a source of speech signals, three band-pass filters having an input terminal connected in parallel to said source, and an output terminal, a first one of said filters being proportioned to pass a subband which embraces the entire frequency range in which the first speech formant may appear, a second one of said filters being proportioned to pass a subband which embraces the entire frequency range in which the second speech formant may appear, a third one of said filters being proportioned to pass a subband which embraces the entire frequency range in which the third speech formant may appear, whereby the subband passed by each of said filters substantially overlaps the subband passed by at least one other of said filters, means connected to the output terminal of said first filter for developing a first control signal proportional to a moment of the integral of the spectrum of the energy passing through said first filter, whereby said control signal is representative of the frequency of the first formant of said speech signals, means connected to the output terminal of said second filter for developing a second control signal proportional to a moment of the spectrum of the energy passing through said second filter, whereby said control signal is representative of the frequency of the second formant of said speech signals, and means connected to the output terminal of said third filter for developing a third control signal proportional to a moment of the derivative of the spectrum of the energy passing through said third filter, whereby said control signal is representative of the frequency of the third formant of said speech signals.

10. Apparatus as defined in claim 9 wherein the means for developing the second formant control signal comprises two independent energy paths extending from the output terminal of the second filter, a first auxiliary filter connected in tandem in one of said paths and proportioned to pass energy within the lower half of the second formant frequency range, a second auxiliary filter connected in tandem in the other of said paths and proportioned to pass energy within the upper half of the second formant frequency range, means for developing a first signal proportional to a moment of a derivative of the spectrum of the energy passing through said first auxiliary filter, means for developing a second signal proportional to a moment of the integral of the spectrum of the energy passing through said second auxiliary filter, and means under control of the energies in said independent paths for effecting a selection as between said first named moment signal and second named moment signal.

11. In combination with apparatus as defined in claim 10, means for influencing said moment signal selection under the joint control of the first formant frequency signal and the third formant frequency signal.

12. Apparatus for deriving, from a speech wave, a first signal representing the frequency of a lower formant of the spectrum of said speech wave and a second signal representing the amplitude of said formant, which comprises means for forming the integral of said wave, means for rectifying said integral and said wave, means for individually averaging said rectified integral and said rectified wave, means for dividing the rectified and averaged wave by the rectified and averaged integral to form a quotient, means for deriving, from said dividing means, a first signal proportional to said formant frequency, and means for multiplying said averaged rectified wave by said first control signal to provide a second control signal proportional to said formant amplitude.

13. Apparatus for deriving, from a speech wave, a first signal representing the frequency of an upper formant of the spectrum of said speech wave and a second signal representing the energy of said formant, which comprises means for forming the first and the second derivatives of said wave, means for rectifying each of said derivatives, means for averaging each of said rectified derivatives, means for dividing the rectified and averaged second derivative by the rectified and averaged first derivative to form a quotient, means for deriving, from said dividing means, a first signal representative of said formant frequency, and means for utilizing said rectified and averaged first derivative as a formant energy signal.

14. Apparatus for deriving, from a quasiperiodic wave $g(t)$ characterized by at least two concentrations of energy on the frequency scale, a control signal representative of a mean frequency of the lower concentration in the presence of the upper concentration, which comprises means for generating from said wave its integral $g^{-}(t)$, means for rectifying said integral and said wave to form the waves $$|g^{-}(t)|,\ |g(t)|$$

means for averaging each of said rectified waves to form the waves $$\overline{|g^{-}(t)|},\ \overline{|g(t)|}$$

and means for dividing the second last-mentioned wave by the first last-mentioned wave to provide said control signal.

15. Apparatus for deriving, from a quasiperiodic wave $g(t)$ characterized by at least two concentrations of energy on the frequency scale, a control signal representative of a mean frequency of the upper concentration in the presence of the lower concentration, which comprises means for generating from said wave its first derivative $g'(t)$ and its second derivative $g''(t)$, means for rectifying each of said derivatives to form the waves $$|g'(t)|,\ |g''(t)|$$

means for averaging each of said rectified derivatives to form the waves $$\overline{|g'(t)|},\ \overline{|g''(t)|}$$

and means for dividing the second last-mentioned wave by the first last-mentioned wave to provide said control signal.

16. Apparatus for deriving, from a quasiperiodic wave $g(t)$ characterized by at least two concentrations of energy on the frequency scale, a first control signal representative of a mean frequency of the lower concentration and a second control signal representative of a mean frequency of the upper concentration, which comprises means for generating from said wave its integral $g^{-}(t)$, its first derivative $g'(t)$ and its second derivative $g''(t)$, means for rectifying each of said waves to form the waves $$|g^{-}(t)|,\ |g(t)|,\ |g'(t)|,\ |g''(t)|$$

means for avergaging each of said rectified waves to form the waves $$\overline{|g^{-}(t)|},\ \overline{|g(t)|},\ \overline{|g'(t)|},\ \overline{|g''(t)|}$$

means for dividing the second last-mentioned wave by the first last-mentioned wave to provide said first control signal, and means for dividing the fourth last-mentioned wave by the third last-mentioned wave to provide said second control signal.

17. Apparatus for deriving, from a quasiperiodic complex wave, a signal representing the frequency of a significant mean member of the group of quasiharmonic components of said wave which together constitute the spectrum of the wave, which comprises means for forming the derivative of said wave, means for rectifying said derivative wave, means for also rectifying said original wave, means for forming the average of each of said rectified waves, means for dividing one of said averages by the other to form a quotient, and means for deriving, from said dividing means, a control signal proportional to said quotient.

18. Apparatus for deriving, from a speech wave, a signal representing the frequency of a formant of the spectrum of said speech wave, which comprises means for forming the derivative wave of said wave, means for rectifying said derivative wave, means for also rectifying said original wave, means for forming the average of each of said rectified waves, means for dividing one of said averages by the other to form a quotient, and means for deriving, from said dividing means, a control signal proportional to said quotient.

19. Apparatus for deriving, from a speech wave, a signal representing the frequency of a formant of the spectrum of said speech wave, which comprises means for forming the first and the second derivatives of said wave, means for rectifying each of said derivatives, means for averaging each of said rectified derivatives, means for dividing the rectified and averaged second derivative by the rectified and averaged first derivative to form a quotient, and means for deriving, from said dividing means, a control signal proportional to said quotient.

References Cited in the file of this patent

UNITED STATES PATENTS

| | | |
|---|---|---|
| 2,243,089 | Dudley | May 27, 1941 |
| 2,635,146 | Steinberg | Apr. 14, 1953 |